Figure 1:
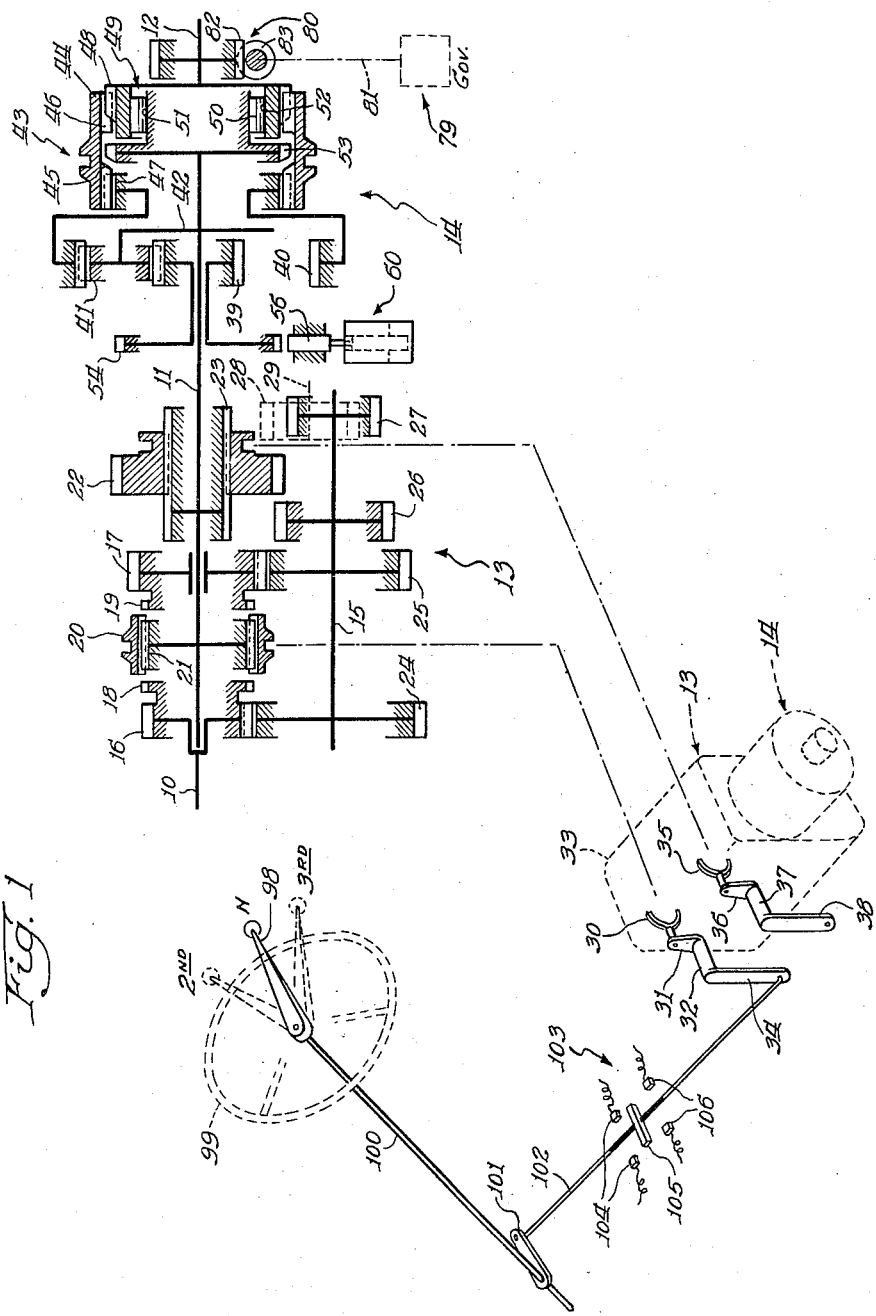

Inventor:
Palmer Orr

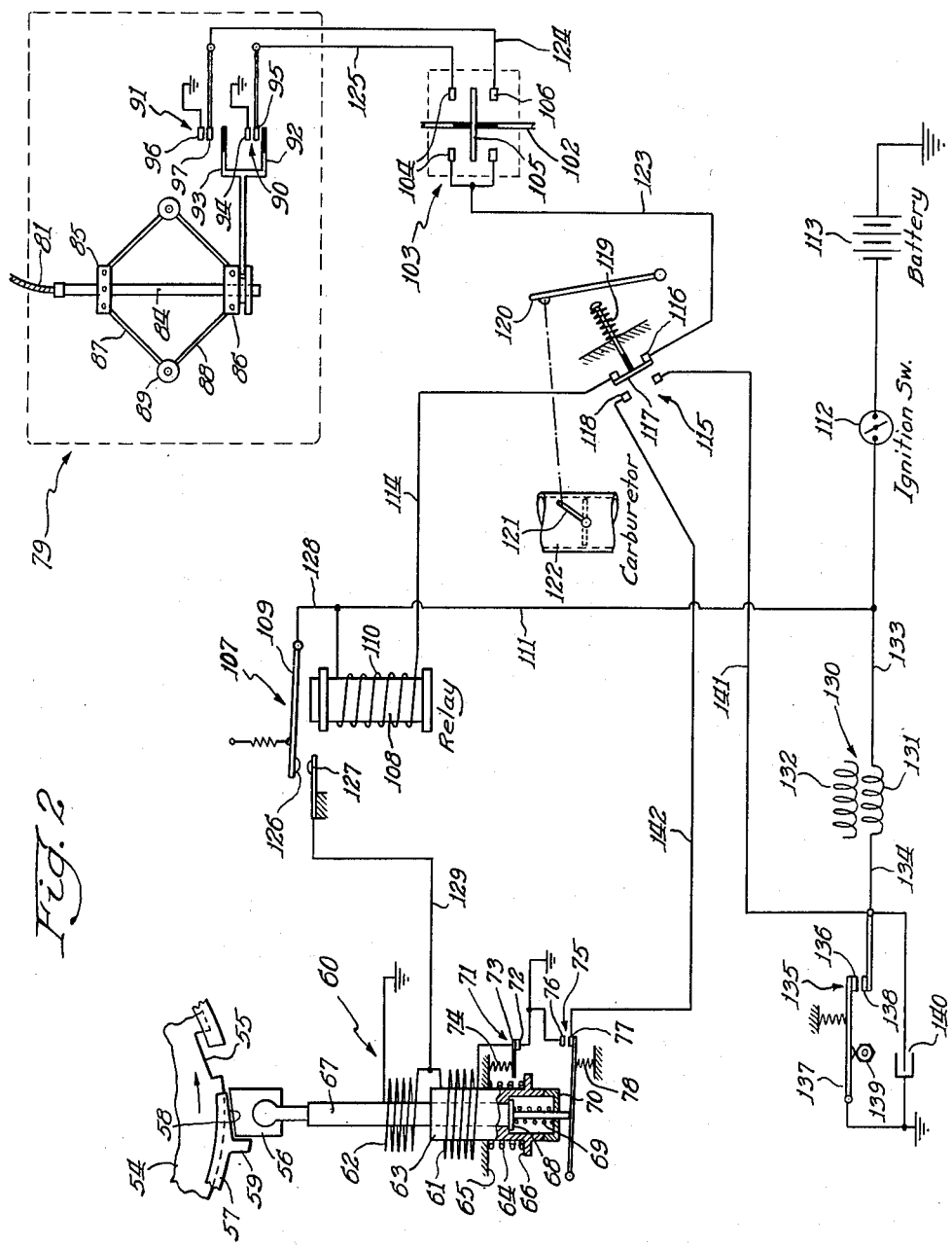

United States Patent Office 2,768,534
Patented Oct. 30, 1956

2,768,534

TRANSMISSION CONTROL

Palmer Orr, Muncie, Ind., assignor to Borg-Warner Corporation, Chicago, Ill., a corporation of Illinois Application March 29, 1951, Serial No. 218,234

13 Claims. (Cl. 74—472)

My invention relates to transmissions for automotive vehicles and more particularly to an automatically controlled planetary overdrive transmission connected in tandem with a manually controlled three speed countershaft type transmission.

Overdrive transmissions in use at present generally are provided with a governor driven by the driven shaft of the transmission for conditioning the overdrive unit for a change from direct drive to overdrive above a predetermined speed of this shaft and the vehicle. When the governor so conditions the overdrive, it is simply necessary for the vehicle operator to release the accelerator of the vehicle for finally completing the overdrive power train through the unit. The governor is set to so condition the overdrive for this change in drive at some advanced vehicle speed, such as, for example 27 miles per hour, below which the ability of the vehicle to accelerate is below par or insufficient in overdrive speed ratio.

In general, it is not contemplated that the overdrive unit shall be used with its overdrive speed ratio completed when the countershaft unit has either its low speed or intermediate speed ratio completed. It is possible by accelerating the vehicle in intermediate speed drive of the countershaft unit to raise the speed of the vehicle above the critical governor speed and then render the overdrive ratio effective by releasing the accelerator; however, the critical governor speed is too high for this operation, so that undesirable high speed operation of the engine results. The combination of intermediate speed drive in the countershaft unit and overdrive in the overdrive unit does, however, provide a desirably high overall speed ratio for lower vehicle speeds, the overall speed ratio being generally somewhat less than a direct drive.

It is accordingly an object of this invention to provide means for changing the critical speed of the governor for the overdrive unit so that the overdrive ratio may be obtained at a lower vehicle speed when the countershaft transmission has its intermediate speed drive completed as compared to the condition when high speed or direct drive is completed through the countershaft unit.

More particularly, it is an object of the invention to automatically cause this change in governor operation to be effective depending on which of the power trains through the countershaft transmission is completed, particularly in accordance with movement of a manually operable selector lever for the countershaft unit manipulated by the vehicle operator.

Still another object of the invention is to provide two speed responsive electric governor switches actuated respectively at relatively low and high speeds of the vehicle which are adapted to be electrically connected with the overdrive operating system by means of switch means operated by the manually operable countershaft unit selector lever for rendering the low speed governor switch operative for the intermediate speed drive through the countershaft transmission and the high speed governor switch operative for the direct drive through the countershaft transmission.

The invention consists of the novel constructions, arrangements and devices to be hereinafter described and claimed for carrying out the above stated objects and such other objects as will be apparent from the following description of a preferred embodiment of the invention, illustrated with reference to the accompanying drawings, wherein:

Fig. 1 is a schematic illustration of a countershaft transmission unit connected in tandem with an overdrive transmission unit and manual controlling mechanism for the countershaft unit; and Fig. 2 is a schematic illustration of an electric controlling system for the overdrive unit.

Like characters of reference designate like parts in the several views.

Referring now in particular to Fig. 1 of the drawings, the illustrated transmission mechanism comprises a drive shaft 10, an intermediate shaft 11 and a driven shaft 12. The drive shaft 10 is adapted to be driven by the vehicle engine (not shown) and the driven shaft 12 is adapted to be connected by any suitable connecting means with the driving road wheels of the vehicle. A countershaft type transmission unit 13 is disposed between the shafts 10 and 11, and an overdrive planetary type transmission unit 14 is disposed between the shafts 11 and 12.

The countershaft unit 13 comprises a countershaft 15 in spaced relation with the shafts 10 and 11. The shaft 11 is piloted with respect to the shaft 10, as shown. A gear 16 is fixed on the shaft 10 and a gear 17 is rotatably disposed on the shaft 11. The gear 16 is provided with clutch teeth 18, and the gear 17 is provided with clutch teeth 19. A clutch collar 20 is splined on a hub 21 fixed to the shaft 11, and the clutch collar 20 is adapted to be moved into engagement with either the teeth 18 or the teeth 19. A gear 22 is splined on a hub 23 fixed to the shaft 11 in any suitable manner as by being formed integrally therewith.

Gears 24, 25, 26 and 27 are fixed on the countershaft 15. An idler gear 28 is rotatably disposed on an idler shaft 29 and is in mesh with the gear 27. The gear 24 is in mesh with the gear 16; the gear 25 is in mesh with the gear 17; and the gears 26 and 28 are adapted to be meshed with the gear 22 when the latter is moved in one direction or the other on its hub 23.

The clutch collar 20 receives a shifting fork 30 in a suitable channel provided in the exterior of the collar 20. The fork 30 is carried by an arm 31 fixed on a shaft 32 rotatably disposed in the transmission casing 33, and a shift lever 34 located on the exterior of the casing 33 is fixed on the shaft 32.

The gear 22 is shifted by means of a fork 35 fitting in a peripheral groove in the gear. The fork 35 is carried by a shift arm 36 fixed on a shaft 37 rotatably disposed in the transmission casing 33. A shift lever 38 located on the exterior of the transmission casing is fixed to the shaft 37.

The overdrive transmission unit 14 comprises a sun gear 39, a ring gear 40, a plurality of planet gears 41 (one being illustrated) in mesh with the sun and ring gears and a planet gear carrier 42. The carrier 42 is connected with the shaft 11, and the ring gear 40 is adapted to be connected with the driven shaft 12 by means of clutching mechanism 43.

The clutching mechanism 43 comprises a clutch sleeve 44 having teeth 45 and 46 respectively in mesh with teeth 47 and 48 in the illustrated position of the sleeve 44. The teeth 47 are formed on the ring gear 40, and the teeth 48 are formed on the driven shaft 12.

A one-way clutch 49, which may be of any suitable construction and, as illustrated, comprises rollers 50 disposed between and adapted to wedge between inner and outer races 51 and 52, is provided for connecting the shafts 11 and 12. The inner race 51 is formed on the shaft 11, and the outer race 52 is formed on the shaft 12. Clutch teeth 53 are formed on the shaft 11, and the teeth 45 are adapted to engage the teeth 53 when the clutch sleeve 44 is moved to the right as seen in the drawing. In this position of the sleeve 44, its teeth 46 remain engaged with the teeth 48 for purposes hereinafter to be described.

An element 54 having slots 55 in its periphery (see Fig. 2) is connected with the sun gear 39, and a reciprocable pawl 56 is adapted to enter the slots 55. A balk ring 57 oscillated by frictional engagement with the rotatable member 54 is provided for preventing at times the entrance of the pawl 56 into any of the slots 55. The balk ring 57 is provided with a ledge 58 with which the pawl 56 is adapted to abut and a boss 59 for contacting a side of the pawl 56 for limiting oscillating movement of the balk ring 57.

An electric solenoid 60 is provided for urging the pawl 56 to engage in any of the slots 55 in the member 54. The solenoid comprises an energizing coil 61 and a holding coil 62 surrounding a movable armature 63 for urging the armature toward the element 54. A spring 64 is provided between a stationary part 65 and an annular ledge 66 on the armature 63 for yieldably holding the armature 63 in its illustrated position. A rod 67 is connected with the pawl 56 and slidably extends through the armature 63. The rod 67 is provided with a flange 68, and a spring 69 is provided between the flange 68 and the internal end surface of a cap 70 fixed to the armature 63. A switch 71 in series with the energizing coil 61 is actuated by the flange 66 on the armature 63. The switch 71 comprises a stationary contact 72 and a movable contact 73 yieldably held in contact with the contact 72 by means of a spring 74. A switch 75 is actuated by the end of the rod 67 and comprises a stationary contact 76 and a movable contact 77 yieldably urged into contact with the contact 76 by a spring 78.

The overdrive unit 14 and particularly the solenoid 60 are under the control of a speed responsive unit or governor 79 driven from the driven shaft 12 of the transmission and thereby in accordance with the speed of the vehicle for imparting automatic operation to the overdrive unit under control of the vehicle operator as will be hereinafter explained. The governor 79 is driven from the shaft 12 by any suitable drive means, such as, for example, gearing 80 and a flexible drive shaft 81. The gearing 80 comprises a gear 82 fixed to the shaft 12 and a gear 83 in mesh with the gear 82 and connected by the flexible shaft 81 with the governor. The governor 79 may be of any suitable construction and, as shown, comprises a shaft 84 driven by the flexible shaft 81, a collar 85 fixed to the shaft 84 and a collar 86 slidably disposed on the shaft 84. The collars 85 and 86 are connected by means of links 87 and 88 and centrifugal weights 89 disposed between the links 87 and 88. The governor 79 is adapted to actuate switches 90 and 91 respectively by means of arms 92 and 93 connected with and movable along with the movable collar 86 which is moved toward the collar 85 by the centrifugal action of the weights 89 acting through the links 87 and 88. The switch 90 comprises a fixed contact 94 and a movable contact 95 adapted to be moved into contact with the contact 94 by means of the arm 92 when the vehicle reaches a predetermined speed such as, for example, 12 miles per hour. The switch 91 comprises a fixed contact 96 and a movable contact 97 adapted to be moved into contact with the contact 96 by means of the arm 93 when the vehicle reaches some higher speed, such as, for example, 25 miles per hour. The contact 97, when the governor is stationary in which condition it is illustrated, is located farther from the arm 93 than the contact 95 is located with respect to the arm 92, so that the arm 93 does not move the contact 97 until a higher speed of the vehicle is reached than that necessary for moving the contact 95 into contact with the contact 94 by means of the arm 92. It will be understood that the contacts 94 and 95 may be resiliently connected with respect to the transmission casing so that the arm 92 may deflect the contacts 94 and 95 after they are engaged to permit further movement of the arm 93 to close contacts 96 and 97, or any other suitable means may be provided to accomplish the same result.

The countershaft transmission unit 13 may be controlled by any suitable means, such as, for example, a speed ratio changing lever 98 (see Fig. 1) disposed immediately beneath the steering wheel 99 of the vehicle. The lever 34 of the transmission 13 may be connected with the lever 98 by means of a steering column shift rod 100, a lever 101 fixed on the rod 100 and a link 102 connecting the levers 101 and 34. If desired, the lever 38 may also be controlled from the selector lever 98 by any suitable means (not shown) in common usage at the present time. The lever 101 is also connected with a switch 103 by means of the link 102, the switch 103 being a part of the electrical control system for the overdrive unit 14. The switch 103 comprises contacts 104 adapted to be connected by means of a switch blade 105 and contacts 106 also adapted to be connected by means of the switch blade 105 in a different position of the blade. The blade 105 is mounted on the link 102.

The electrical system for controlling the overdrive also comprises a relay 107 (see Fig. 2) having a magnetizable core 108 and a movable armature 109 attracted to the core when magnetized. A winding 110 is disposed about the core 110 for magnetizing it, and the winding 108 at one end is connected by a lead 111 with the ignition switch 112 of the vehicle which in turn is connected with the vehicle battery 113 having one terminal grounded, as shown. The winding 110 at its other end is connected by means of a lead 114 with a kickdown switch 115.

The kickdown switch 115 comprises a pair of contacts 116 adapted to be connected by means of a switch blade 117 and a pair of contacts 118 also adapted to be connected by means of the blade 117 in a different position of the blade. One of the contacts 116 is connected with the lead 114, as shown. The switch blade 117 is yieldably held in its illustrated position connecting the contacts 116 by means of a spring 119. The kickdown switch 115 is actuated by the vehicle accelerator 120 when the vehicle accelerator is moved to an open throttle kickdown position for moving the switch blade 117 against the action of the spring 119 out of contact with the contacts 116 and into contact with the contacts 118. The accelerator 120 actuates a vehicle throttle lever 121 on the engine carburetor 122 of the vehicle in accordance with usual practice.

The other of the contacts 116 is connected by means of a lead 123 with one each of the contacts 104 and 106 of the switch 103, and the other contacts 106 and 104 are respectively connected by means of leads 124 and 125 with the movable contacts 97 and 95 of the governor switches 91 and 90. The other governor contacts 96 and 94 are grounded, as shown.

The relay armature 109 carries a contact 126 movable with the armature into contact with a stationary contact 127 when the relay is energized. The contact 126 is connected by means of a lead 128 and the lead 111 with the ignition switch 112, and the contact 127 is connected by means of a lead 129 with one end of each of the armature coils 61 and 62. The other end of the coil 62 is grounded as shown, and the other end of the coil 61 is connected with the movable contact 73 of the switch 71 which has its other contact 72 grounded.

The ignition system of the vehicle engine comprises the usual ignition coil 130 having a primary winding 131 and a secondary winding 132. The primary winding 131 on one end is connected by means of a lead 133 with the ignition switch 112, and the secondary winding 132 providing a high voltage on intermittent current flow through the winding 131 is connected with the usual spark plugs of the vehicle engine (not shown) in accordance with the usual practice. The primary winding 131 of the ignition coil 130 on its other end is connected by means of a lead 134 with the usual interrupter switch 135. The switch 135 comprises a contact 136 carried by a movable arm 137 and a stationary contact 138. The arm 137 is pivotally moved by riding on a rotary straight sided cam 139 so as to intermittently bring the contacts 136 and 138 into contact, and the contact 136 is grounded through the arm 137 to provide the intermittent current flow through the winding 131. The usual condenser 140 is shunted across the contacts 138 and 136.

One of the contacts 118 of the kickdown switch 115 is connected by means of a lead 141 with the contact 138, and the other contact 118 of the switch 115 is connected by means of a lead 142 with the contact 77 of the switch 75. The other contact 76 of the switch 75 is grounded, as shown.

In operation, the countershaft unit 13 provides three forward drives of different speed ratio, including a low speed drive, an intermediate speed drive and a direct drive, and also a drive in reverse. Low speed forward drive is obtained by moving the gear 22 into mesh with the gear 26, and the power train is then from the drive shaft 10 through the gears 16 and 24, the countershaft 15 and the gears 26 and 22 to the shaft 11. Intermediate speed forward drive is obtained by moving the clutch sleeve 20 into mesh with the teeth 19, and the drive in this case is from the shaft 10 through the gears 16 and 24, the countershaft 15, the gears 25 and 17 and the clutch sleeve 20 to the shaft 11. Direct drive is obtained by moving the clutch sleeve 20 into mesh with the teeth 18, and the drive in this case is from the shaft 10 through the gear 16, the clutch teeth 18 and the clutch sleeve 20 to the shaft 11. Reverse drive is obtained by moving the gear 22 into mesh with the idler gear 28, and the drive in this case is from the shaft 10 through the gears 16 and 24, the countershaft 15 and the gears 27, 28 and 22 to the shaft 11.

The gear 22 of the countershaft unit 13 is moved in one direction or the other by means of the lever 38 through the intermediary of the shaft 37, the lever 36 and the fork 35, and this may be done by any suitable manually operated controls, such as, for example, the selector lever 98, assuming that suitable connecting mechanism, such as that in common usage at present (not shown), is provided. The clutch sleeve 20 is moved into engagement either with the teeth 19 or the teeth 18 for respectively providing the intermediate or direct drives by actuating the lever 34 and thereby the sleeve 20 through the intermediary of the shaft 32, the lever 31 and the fork 30. The selector lever 98 located adjacent the steering wheel 99 of the vehicle is utilized for this purpose, and the lever 34 is moved from the selector lever 98 through the intermediary of the steering column rod 100, the lever 101 which is fixed to the rod 100 and is moved along with it, and the link 102 connecting the levers 101 and 34.

The overdrive unit 14 provides a direct drive and also an overdrive speed ratio. Direct drive and overdrive are provided with the clutch sleeve 44 in its illustrated position in mesh both with the clutch teeth 47 and also with the clutch teeth 48. Direct drive is obtained with the pawl 56 being in its illustrated position, out of engagement with the member 54, and in this case the drive through the transmission is from the shaft 11 which functions as the input shaft for the overdrive unit, through the one-way clutch 49, to the driven shaft 12, the rollers 50 of the one-way clutch wedging, in accordance with the well-known mode of operation of said clutches, between the inner and outer races 51 and 52.

Overdrive is obtained through the unit 14 when the pawl 56 is moved into engagement with the slotted element 54 for braking and holding this element stationary. This is done by means of the solenoid 60 as will hereinafter be described. In this case, the sun gear 39 connected with the element 54 is held stationary and functions as a reaction member of the gear unit 14 whereby the ring gear 40 is rotated at an overspeed with respect to the shaft 11. This overspeed drive is transmitted through the clutch teeth 47, the clutch sleeve 44 and the teeth 48 to the driven shaft 12, and the one-way clutch 49 overruns.

A two way direct drive is obtained by moving the clutch sleeve 44 to the right to engage both with the teeth 53 and the teeth 48, thereby bridging the one-way clutch 51, and the clutch sleeve 44 in this position may also be utilized for transmitting the reverse drive from the countershaft unit 13 to the shaft 12.

The ignition system of the vehicle engine comprising the ignition coil 130 and distributor circuit breaker switch 135 functons in the ordinary well-known manner. The switch 135 is opened and closed due to rotation of the cam 139 thereby opening and closing the circuit through the primary winding 131 of the ignition coil 130. A high voltage is thereby induced in the secondary winding 132 of the coil 130 which is applied to the spark plugs (not shown) of the vehicle engine. The condenser 140 inhibits undue arcing across the contacts 136 and 138 of the switch 135.

The solenoid 60 is energized by a closing of either the governor switch 90 or the governor switch 91 depending on whether the intermediate speed drive or the direct drive is completed through the countershaft unit 13, and this energization of the solenoid 60 functions to cause a movement of the pawl 56 against the slanted surface 58 of the oscillatable balk ring 57, conditioning the pawl for engagement in one of the slots 55 for braking the member 54 and sun gear 39 when the accelerator 120 is released to allow a reversal of torque to take place in the overdrive unit 14. Assuming that the intermediate speed drive is completed through the countershaft unit 13, the selector lever 98 and thereby the lever 101 are in their second or intermediate speed drive positions, and the switch arm 105 bridges the contacts 104 in the switch 103. Below the critical speed of the switch 90, the speed of rotation of the shaft 12 and thereby of the governor weights 89 is not sufficient to move the collar 86 and the arm 92 sufficiently so as to bring the contact 95 into contact with the contact 94. As the speed of the vehicle, the driven shaft 12, and thereby the governor 79, its shaft 84, and the weights 89 increase, however, the centrifugal force on the weights 89 increases, and the weights 89 through the links 87 and 88 move the collar 86 and thereby the arm 92 closer to the collar 85 fixed on the shaft 84, and when a critical increased governor speed is reached, the collar 86 and arm 92 move sufficiently to bring the contact 95 into contact with the contact 94 to complete a circuit through the governor switch 90.

When the switch 90 is closed, a circuit is thereby completed through the relay 107, energizing the relay. This circuit is from the battery 113, through the ignition switch 112, the lead 111, the relay winding 110, the lead 114, the switch contacts 116, the switch blade 117, the switch contacts 104, the switch blade 105 and the governor switch 90. Energization of the relay 107 causes its armature 109 to move toward the core 108 and close the contacts 126 and 127, and closure of these contacts completes a circuit from the ignition switch 112 through the leads 111 and 128, the contacts 126 and 127, and through both solenoid windings 62 and 61, the circuit through the latter being completed by means of the switch 71 which is closed in the illustrated position of the solenoid armature 63. Both of the solenoid windings 62 and 61 are thereby energized. Energization of the solenoid windings 61 and 62 causes the solenoid armature 63 to move against the action of the springs 64 and 69 toward the member 54, and this movement of the armature moves the contact 73 away from the contact 72 and breaks the circuit through the energizing winding 61. The effects of both of the windings 61 and 62 are needed for moving the armature 63 into energized position toward the member 54; however, the effect of only the winding 62 is sufficient for thereafter holding it in energized position.

This movement of the solenoid armature 63 moves the rod 67 and pawl 56, through the action of the spring 69 on the flange 68, to bring the pawl 56 into abutting relation with the ledge 58 of the balk ring 57, and further movement of the pawl 56 toward engaging position with the slotted element 54 is prevented by the balk ring 57. It is assumed that this energization of the solenoid 60 occurs when the accelerator is depressed to a position between its throttle opening and throttle closing positions and that the drive through the planetary unit 14 is through the one-way clutch 49, and under these conditions the sun gear 39 is rotating at the same speed as the shafts 11 and 12, as is the slotted element 54, so that the frictional contact between the balk ring 57 and the slotted element 54 holds the balk ring 57 in its illustrated position in which it blocks further movement of the pawl 56.

When the accelerator is subsequently released, the one-way clutch 49 overruns, and the speed of the slotted element 54 decreases, so that the slotted element 54 and sun gear 39 finally stop and begin to rotate in the reverse direction, that is, in the direction opposite to the direction of rotation of the shafts 11 and 12. Such movement of the slotted element 54 causes the balk ring 57 to move in the clockwise direction as seen in the drawing out of blocking position with respect to the pawl 56 due to the frictional contact between the balk ring 57 and slotted element 54, and the pawl 56 moves into one of the slots 55 in the slotted element 54 under the action of the spring 69, inasmuch as the armature 63 in the solenoid remains in its energized position. When the pawl 56 is in one of the slots 55, the element 54 and the sun gear 39 are thereby braked, and the overdrive power train through the planetary unit 14 is completed, and the drive of the vehicle may be resumed by again depressing the accelerator 120 to a throttle opening position. The switch 75 is closed by the movement of the pawl 56 and the rod 67 into their overdrive positions in which the pawl 56 is in one of the slots 55, for purposes now to be described.

A kickdown, or a change in drive through the planetary unit 14 from overdrive to direct drive under manual control, may be obtained by moving the accelerator 120 into an open throttle position, actuating the switch 115 and causing the switch blade 117 to move out of contact with the contacts 116 and into contact with the contacts 118 to connect the latter. The opening of the contacts 116 breaks the circuit through the relay winding 119 causing deenergization of the relay and a return of the armature 109 into its illustrated position, opening the contacts 126 and 127. This opening of the contacts 126 and 127 breaks the circuit through the solenoid 60 and particularly the holding coil 62, so that the spring 64 tends to move the solenoid armature 63 back into its illustrated, deenergized position and tends to move the pawl 56 and rod 67 back into their illustrated, direct drive positions by action of the armature on the flange 68 of the rod 67. A drive through the overdrive unit 14 from the shaft 11 to the shaft 12, as when the engine is normally driving the vehicle in overdrive speed ratio, tends to prevent such movement of the pawl 56, inasmuch as there is a thrust between the pawl 56 and a side of one of the slots 55 in the slotted element 54 under these conditions, and for the purpose of relieving momentarily such thrust to permit the pawl 56 to move out of engagement with the slotted element 54, the closing of the contacts 118 by means of the switch blade 117 grounds the ignition system of the vehicle to cause a reversal of torque. The grounding circuit extends from the primary winding 131 of the ignition coil 130 through the lead 141, the contacts 118, the switch blade 117, the lead 142 and the switch 75 which is closed, as has been described, when the pawl 56 is in engagement with one of the slots 55. The grounding of the ignition coil 130 causes the vehicle engine to cease firing and disables the engine, so that the shaft 12 tends to drive the shaft 11 instead of vice versa, and reverses the drive through the unit 14 whereby the thrust on the pawl 56 from a side of one of the slots 55 is relieved, and the pawl 56 then moves out of engagement with the slotted element 54 due to the action of the spring 64. The switch 75 is opened by movement of the pawl 56 and rod 67 to their illustrated, direct drive positions, and the ignition grounding circuit is opened to return the vehicle engine to operative condition. The direct drive through the planetary unit 14 is then again effective, the drive being through the one-way clutch 49 and from the intermediate shaft 11 to the driven shaft 12.

When the countershaft unit 13 is in direct drive condition, the levers 98 and 101 are in their 3rd or direct drive positions, and the switch blade 105 in this case bridges the contacts 106 of the switch 103. Under these conditions, the governor switch 91 must be effective for energizing the solenoid 60, and the governor switch 91, due to the construction of the governor, is not closed until some higher vehicle speed is reached than that at which the governor switch 90 is closed. When the higher speed of the vehicle is reached, the arm 93 of the governor moves the contact 97 into contact with the contact 96 to close the switch 91, and the relay 107 is energized through the switch 91 and the contacts 106 of the switch 103 actuated by the selector lever 98, the remainder of the circuit through the relay winding 110 being the same as for the governor switch 90. The solenoid 60 is energized simultaneously with the relay 107 as has been previously described. The overdrive unit 14 is then changed from direct drive condition to overdrive condition by releasing the accelerator 120 in the same manner as when intermediate speed drive is effective through the countershaft unit 13, and a kickdown or change from overdrive to direct drive may subsequently be obtained by depressing the accelerator 120 to an open throttle kickdown position in the same manner as the direct drive was obtained in the unit 14 for intermediate speed drive through the countershaft unit 13.

I have provided the governor switch 91 closed above a predetermined high speed of the vehicle for conditioning the overdrive unit 14 for operation by energizing the solenoid 60 with the countershaft unit 13 driving in direct drive, so that overdrive speed ratio cannot be obtained below this predetermined speed, inasmuch as the vehicle would have insufficient acceleration ability below this vehicle speed, and the overdrive speed ratio between the shafts 10 and 12 would hence not be desirable below this vehicle speed.

It is, however, sometimes desirable to have the overdrive speed ratio through the planetary gear unit 14 effective when the countershaft unit is driving in intermediate speed ratio in order to provide an overall ratio between the shafts 10 and 12 which will be higher than that obtained with the planetary unit 14 driving in direct drive, and it is desirable to obtain this ratio at a vehicle speed less than that at which the governor switch 91 is closed, since vehicle engine speed would become excessive in intermediate speed drive of the unit 13 at vehicle speeds approximating that at which the governor switch 91 is closed. This intermediate-overdrive ratio may preferably be somewhat less than direct drive provided when both the units 13 and 14 are in their direct drive conditions. For this purpose, I have provided the governor switch 90 which is closed at a lower vehicle speed than is the switch 91, the switch 90 being effective when the countershaft unit 13 is in its intermediate speed drive condition for the same purposes as the governor switch 91, namely, for causing energization of the solenoid 60. With the illustrated transmission control system, the intermediate-overdrive speed ratio drive between the shafts 10 and 12 is advantageously obtainable at a somewhat reduced vehicle speed below which the intermediate-overdrive speed ratio would not have sufficient power for vehicle acceleration purposes but above which the intermediate-overdrive speed ratio is sufficient for this purpose.

I wish it to be understood that my invention is not to be limited to the specific constructions and arrangements shown and described, except only insofar as the claims may be so limited, as it will be apparent to those skilled in the art that changes may be made without departing from the principles of the invention.

I claim:

1. In transmission mechanism, the combination of a drive shaft, a driven shaft, first and second power transmission units connected in tandem between said shafts, each of said units providing a plurality of drives of different speed ratio through the unit, means for changing the drive through said first transmission unit and including a governor means driven in fixed speed ratio with the speed of said driven shaft and effective at a certain speed of said last named shaft for controlling the change in drive, and means connected with said governor means controlled coordinately with the second of said units for changing the effect of said governor means for causing it to be so effective for controlling the change in drive at a different speed of said last named shaft when the drive through said second unit is changed.

2. In transmission mechanism, the combination of a drive shaft, a driven shaft, first and second power transmission units connected in tandem between said shafts and each providing two drives of different speed ratio through the unit, means for changing the drive through said first unit and including two speed responsive means responsive to changes in speed of one of said shafts for controlling the change in drive through the unit at two different speeds of said last named shaft respectively, and means controlled coordinately with said second transmission unit for causing one of said speed responsive means to be effective when one of the drives through said second unit is effective and for causing the other speed responsive means to be effective when the other of said drives through said second unit is effective.

3. In transmission mechanism, the combination of a drive shaft, a driven shaft, first and second power transmission units connected in tandem between said shafts, each of said units providing, a plurality of drives of different speed ratio through the unit, means for changing the drive through said first unit and including two speed responsive means responsive to the speed of said driven shaft and effective at different speeds of said last named shaft for controlling the change in drive, manually operated means for changing the drive through said second unit from one of its drives to the other, and means under the control of said manually operated means for causing one of said speed responsive means to be effective for one speed drive through said second unit and for causing the other speed responsive means to be effective for the other drive through said last named unit.

4. In transmission mechanism, the combination of a drive shaft, a driven shaft, first and second power transmission units connected in tandem between said shafts, each of said units providing two drives of different speed ratio through the unit, means for changing the drive through said first unit and including two speed controlled switches actuated according to and at different speeds of said driven shaft and each controlling the change in drive, manually operated means for changing the drive through said second unit, and switch means actuated by said manually operated means and connected with said speed controlled switches for rendering one of said switches operative to control said first unit when said second unit is conditioned for driving in one of its drives and for rendering the other speed controlled switch operative when said second unit is conditioned for driving in its other drive.

5. In transmission mechanism, the combination of a drive shaft, a driven shaft, first and second power transmission units connected in tandem between said shafts, each of said units providing a low speed drive and a high speed drive through the unit, means for changing from the low speed drive to the high speed drive through said first unit and including two governor means responsive to the speed of said driven shaft and effective at a relatively low speed and at a relatively high speed respectively of said driven shaft for controlling the change in drive, means for changing the drive in said second unit from said low speed to said high speed drive in the unit, and means controlled by said last named means for rendering the low speed governor means effective in the low speed drive of said second unit and for rendering the high speed governor means effective in the high speed drive of said second unit.

6. In transmission mechanism, the combination of a drive shaft, a driven shaft, a first transmission unit connected with said drive shaft and providing a low and a high speed drive therethrough, a second power transmission unit connected between said first transmission unit and said driven shaft and providing a low and a high speed drive therethrough, means for automatically changing the drive through said second unit from its low speed drive to its high speed drive and including two governor means responsive to the speed of said driven shaft and effective at relatively low and high speeds respectively of said driven shaft for controlling the change in drive, manually operated means for causing a change in drive in said first unit from its low speed drive to its high speed drive, and means under the control of said last named means for rendering the low speed governor means effective only during the low speed drive of said first unit and for rendering said high speed governor means effective only during the high speed drive of said first unit.

7. In transmission mechanism for an automotive vehicle having a driving engine, the combination of a drive shaft, a driven shaft, a throttle control for the vehicle engine, first and second power transmission units connected in tandem between said shafts, each of said units providing a low speed drive and a high speed drive through the unit, means for changing the drive through said first unit from its low speed drive to its high speed drive and including a pair of governor means responsive to changes in speed of said driven shaft and effective at a relatively low speed and a relatively high speed respectively of said last named shaft for conditioning the transmission unit for the change in drive, and means under the control of said throttle control for completing the high speed drive in said first unit when the throttle control is released to its closed throttle position, means for manually changing the drive through said second unit from its low speed drive to its high speed drive, and means under the control of said last named means for rendering the low speed governor means effective only during the low speed drive of said second unit and for rendering the high speed governor means effective only during the high speed drive of said second unit, 8. In transmission mechanism for an automotive vehicle having a driving engine, the combination of a drive shaft, a driven shaft, a throttle control for the vehicle engine, first and second power transmission units connected in tandem between said shafts, each of said units providing a low speed drive and a high speed drive through the unit, means for changing the drive through said first unit and including two governor switches responsive to changes in speed of said driven shaft and effective at a relatively low speed and a relatively high speed respectively of the driven shaft for conditioning the unit for a change from its low speed drive to its high speed drive and means under the control of the throttle control for completing the change in drive to said high speed drive in said first unit when the throttle control is released to its closed throttle position, means for manually changing the drive in said second unit between its two drives, and switch means controlled by said last named means and connected with said governor switches for rendering the low speed governor switch effective when said second transmission unit is conditioned for its low speed drive and for rendering the high speed governor switch effective when said second transmission unit is conditioned for its high speed drive.

9. In transmission mechanism, the combination comprising a drive shaft, a driven shaft, means providing a plurality of drives of different speed ratio between said shafts, governor means responsive to the speed of one of said shafts, a pair of speed responsive means responsive to the speed of said governor means controlling a change from one of said drives to another of said drives, and means rendering only one of said speed responsive means effective during one of said plurality of drives and for rendering the other of said speed responsive means effective only during another of said plurality of drives.

10. In transmission mechanism, the combination comprising a drive shaft, a driven shaft, means providing a plurality of drives of different speed ratio between said shafts, a governor responsive to changes in speed of one of said shafts constructed and arranged to control a change from a first of said drives to a second of said drives at a certain low speed of said one shaft, a second governor responsive to changes in speed of said last named shaft constructed and arranged to control a change from said first drive to said second drive at a certain high speed of said one shaft, and means under manual control for selectively rendering one or the other of said governors effective.

11. In transmission mechanism for an automotive vehicle having a driving engine, the combination comprising a drive shaft, a driven shaft, a throttle control for the vehicle engine, means providing a low speed drive and a high speed drive between said shafts, means for conditioning the transmission mechanism for a change from said low speed drive to said high speed drive and including two governor means responsive to the speed of said driven shaft and constructed and arranged to control the change from said low speed drive to said high speed drive at certain low and high speeds of the driven shaft respectively, means including said throttle control for completing the change from said low speed drive to said high speed drive when the throttle control is moved to a closed throttle position, and manually operated means for causing either one or the other of said governor means to be effective to condition for a change in drive.

12. In a transmission mechanism, the combination of a drive shaft, a driven shaft, first and second power transmission units connected between said shafts and each providing at least two drives of different speed ratios through the unit, control means operable to change the drive through said first unit from one of its drives to another, a pair of means responsive to the speed of said driven shaft and effective at different speeds thereof to change the drive through said second unit from one of its drives to another, and means operable substantially simultaneously with said control means selectively permitting only one of said pair of means responsive to the speed of said driven shaft to be effective during one of the drives through said first unit and permitting the other of said means responsive to the speed of said driven shaft to be effective only during another of said drives through said first unit.

13. In transmission mechanism, the combination comprising a drive shaft, a driven shaft, means providing a plurality of drives of different speed ratio between said shafts, control means for effecting the establishment of certain drives through said last-mentioned means, a governor responsive to changes in speed of one of said shafts, a pair of governor responsive means effective to control a change from one of said plurality of drives to another of said drives, and means responsive to said control means adapted and arranged to render only one of said governor responsive means effective during one of said plurality drives and to render the other of said governor responsive means effective only during another of said plurality of drives.

References Cited in the file of this patent
UNITED STATES PATENTS

| | | |
|---|---|---|
| 2,177,951 | Simpson | Oct. 31, 1939 |
| 2,328,291 | Osborne | Aug. 31, 1943 |
| 2,342,960 | Neracher | Feb. 29, 1944 |
| 2,343,291 | Gilfillan et al. | Mar. 7, 1944 |
| 2,348,763 | Syrory | May 16, 1944 |
| 2,375,816 | Orr | May 15, 1945 |
| 2,440,558 | Price | Apr. 27, 1948 |